(12) United States Patent
Cotton

(10) Patent No.: US 10,941,679 B2
(45) Date of Patent: *Mar. 9, 2021

(54) ENHANCED OILING FOR SLIDING VALVE ASPIRATION SYSTEM

(71) Applicant: Grace Capital Partners, LLC, Little Rock, AR (US)

(72) Inventor: Gary W. Cotton, Ward, AR (US)

(73) Assignee: Grace Capital Partners LLC, Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,591

(22) Filed: Feb. 7, 2019

(65) Prior Publication Data
US 2019/0257225 A1    Aug. 22, 2019

Related U.S. Application Data

(60) Provisional application No. 62/633,436, filed on Feb. 21, 2018.

(51) Int. Cl.
| | |
|---|---|
| *F01L 5/08* | (2006.01) |
| *F01L 9/02* | (2006.01) |
| *F01L 7/02* | (2006.01) |
| *F01L 5/04* | (2006.01) |
| *F01L 3/14* | (2006.01) |
| *F16K 31/52* | (2006.01) |
| *F01L 9/04* | (2006.01) |

(52) U.S. Cl.
CPC ............... *F01L 5/08* (2013.01); *F01L 3/14* (2013.01); *F01L 5/045* (2013.01); *F01L 7/02* (2013.01); *F01L 9/02* (2013.01); *F16K 31/523* (2013.01); *F01L 9/04* (2013.01); *F01L 2301/00* (2020.05); *F01L 2810/02* (2013.01)

(58) Field of Classification Search
CPC ....... F01L 5/08; F01L 7/02; F01L 9/02; F01L 9/04; F01L 2101/00; F01L 2810/02; F01L 5/045; F01L 3/14; F16K 31/523
See application file for complete search history.

(56) References Cited

U.S. PATENT DOCUMENTS

| | | | |
|---|---|---|---|
| 1,069,794 | A | 8/1913 | Lazier |
| 1,114,521 | A | 10/1914 | Platt |
| 1,142,949 | A | 6/1915 | Fay |
| 1,169,353 | A | 1/1916 | Reeve |
| 1,169,354 | A | 1/1916 | Reeve |
| 1,286,967 | A | 12/1918 | Eschwei |
| 1,492,587 | A * | 5/1924 | Toth ........................ F01L 5/045  123/312 |
| 1,550,643 | A | 8/1925 | Bullington |

(Continued)

*Primary Examiner* — Syed O Hasan
(74) *Attorney, Agent, or Firm* — Stephen D. Carver

(57) ABSTRACT

Improved multi-section slide valves for internal combustion engines for improved aspiration comprise spaced apart, continuously pressurized, annular oil confinement zones that are defined between select groups of arrays of piston rings. The oil confinement zones are axially spaced along the length of the slide valve and continuously pressured by oil flow passageways communicating between spaced apart arrays of piston rings. During slide valve movement these pressurized oil confinement zones tend to stabilize the slide valve, preventing metal-to-metal contact such as that associated with rocking, tipping, chafing or scrubbing.

4 Claims, 7 Drawing Sheets

(56) References Cited

U.S. PATENT DOCUMENTS

| | | | |
|---|---|---|---|
| 1,612,550 A | 12/1926 | Tom | |
| 1,640,958 A | 8/1927 | Nelson | |
| 1,777,792 A | 10/1930 | Grace | |
| 1,794,256 A | 2/1931 | Stuart | |
| 1,855,634 A | 4/1932 | Ingalls | |
| 1,856,348 A | 5/1932 | McMillan | |
| 1,890,976 A | 12/1932 | Erickson | |
| 1,905,140 A | 4/1933 | Boyce | |
| 1,942,648 A | 1/1934 | Jensen | |
| 1,995,307 A | 3/1937 | Hickey | |
| 2,080,126 A | 5/1937 | Gibson | |
| 2,160,000 A | 5/1939 | Rhein | |
| 2,164,522 A | 7/1939 | Howard | |
| 2,021,292 A | 5/1940 | Hickey | |
| 2,302,442 A * | 11/1942 | Hickey | F01L 7/02 123/188.4 |
| 3,533,429 A | 10/1970 | Shoulders | |
| 4,765,287 A * | 8/1988 | Taylor | F01L 5/02 123/188.4 |
| 5,579,730 A | 12/1996 | Trotter | |
| 6,006,714 A | 12/1999 | Griffin | |
| 6,776,129 B2 | 8/2004 | Diehl | |
| 7,089,893 B1 | 8/2006 | Ostling | |
| 7,263,963 B2 * | 9/2007 | Price | F01L 5/04 123/188.4 |
| 7,264,964 B2 | 9/2007 | Dang | |
| 7,401,587 B2 * | 7/2008 | Thomas | F01L 7/02 123/190.17 |
| 8,087,393 B2 * | 1/2012 | Cascia | F01L 1/022 123/188.4 |
| 8,210,147 B2 | 7/2012 | Cotton | |
| 8,459,227 B2 | 6/2013 | Cotton | |
| 8,776,756 B2 * | 7/2014 | Cotton | F01L 7/16 123/188.5 |
| 2001/0020693 A1 * | 9/2001 | Bischofberger | F01L 7/02 251/368 |
| 2009/0288630 A1 * | 11/2009 | Cascia | F01L 1/022 123/188.4 |

* cited by examiner

ENHANCED OILING FOR SLIDING VALVE ASPIRATION SYSTEM

CROSS-REFERENCE TO RELATED APPLICATION

This utility conversion patent application claims priority from and is based upon a previously filed, U.S. Provisional Application entitled "Enhanced Oiling for Sliding Valve Aspiration System", Ser. No. 62/633,436, filed Feb. 21, 2018, by inventor Gary W. Cotton of Ward Ark., which is hereby incorporated by reference as if fully set forth herein.

BACKGROUND OF THE INVENTION

I. Field of the Invention

The present invention relates generally to internal combustion engine aspiration systems utilizing slide valves rather than poppet valves. More particularly, the present invention relates to slide valve aspiration systems wherein oil pressure is utilized for valve stabilization and control. Known prior art aspiration systems of the slide valve type can be found USPC Class 123, Subclasses 188.4 and 188.5 and CPC classes F01L 5/00 (20060101); F01L 7/02 (20130101); F01L 7/16 (20130101); F01L 7/14 (20130101); F01L 2101/00 (20130101).

II. Description of the Prior Art

U.S. Pat. No. 8,210,147 issued Jul. 3, 2012, and entitled "Sliding Valve Aspiration System," discloses an internal combustion engine with separate, tubular and hollow sleeve valves that open and close intake and exhaust passageways for improved aspiration. The sliding valves are disposed within sleeves disposed within a head secured proximate the combustion chamber. The valves are driven in a path normal to the engine pistons by an independent crankshaft that is rotated through an external pulley driven by the engine crankshaft. Fluid flow occurs through the valve interior and through ports dynamically positioned near the compression cylinder, proximate aligned sleeve and head ports. It is the purpose of the instant invention to improve upon the design set forth in U.S. Pat. No. 8,210,147.

As reported in the latter patent, in a typical four-cycle firing sequence, gases are first inputted and then withdrawn from the combustion chamber of each cylinder interior during reciprocating piston movements caused by the crankshaft. Gas pathways must be opened and closed repetitively during a typical cycle. During the intake stroke, for example, an air/fuel mixture is suctioned through an open intake passageway into the combustion chamber as the piston is drawn downwardly within the cylinder. The intake passageway is typically opened and closed by some form of reciprocating valve mechanism that is ultimately driven by mechanical interconnection to the crankshaft. The combustion chamber must be sealed during the following compression and power strokes, and the valve mechanisms must be closed to block the ports. During the following exhaust stroke, exhaust ports must be opened to discharge spent gases from the combustion chamber.

Spring-biased poppet valves are the most common form of internal combustion engine valve. In overhead valve systems, poppet valves associated with the intake and exhaust passageways are seated within the cylinder head above the combustion chamber proximate the cylinder and piston. Typical reciprocating poppet valves are spring biased, assuming a normally closed position when not deflected. Poppet valves are typically opened by mechanical deflection from valve train apparatus driven by camshafts. Older overhead-valve designs include rocker arms comprising reciprocating levers driven by push rods in contact with camshaft lobes. When the camshaft lobe deflects a pushrod to raise one end of the rocker arm, the opposite arm end pivots downwardly and opens the valve. When the camshaft rotates further, the rocker arm relaxes and spring pressure closes the valve.

With modern overhead-cam designs, camshafts are disposed over the valves above the head, and directly deflect the valves without push rods or rocker arms. Some push directly on the valve stem through cam followers or tappets. Some V-configured engines use twin overhead camshafts (i.e., DOHC), one for each head. Some enhanced DOHC designs use two camshafts in each head, one for the intake valves and one for the exhaust valves. The camshafts are driven by the crankshaft through gears, chains, or belts.

Despite the overwhelming commercial success of poppet-valve designs, they are characterized by various deficiencies and disadvantages. Although poppet valve designs provide manufacturing advantages and cost savings, substantial spring pressure must be repeatedly overcome to properly open the valves. Spring pressure results in considerable drag and friction, which increases fuel consumption, increases wear, and limits engine RPM. Poppet valve heads are left within the fluid flow passageway, despite camshaft deflection, and the resulting obstruction in the gas flow pathway promotes inefficiency. For example, back pressure is increased by the valve mass obstructing fluid flow, which contributes to turbulence. Poppet valves are exposed to high combustion chamber temperatures, particularly during the exhaust stroke, that can promote deformation and wear. Thermal expansion of exhaust valves, for example, can interfere with proper valve seating and subsequent sealing, which can decrease combustion performance.

Sliding valves of many configurations are also known in the art. Typical slide valves may be hollow and tubular, or cylindrical. They are reciprocated within a tubular valve seat region proximate the combustion chamber to alternately open and then close the intake and exhaust passageways. Like rotary valves, sliding valve designs have hitherto been difficult to seal effectively, with predictable negative results.

U.S. Pat. No. 2,080,126 issued May 11, 1937 to Gibson shows a sliding valve arrangement involving a tubular valve driven by a secondary crankshaft. Its reciprocating axis is parallel to the axis of piston deflection. Ports arranged at the side of the piston are alternately opened and closed by piston movements, and gases are conducted through and around portions of the piston exterior.

A similar arrangement is seen in U.S. Pat. No. 1,995,307 issued Mar. 26, 1935, and U.S. Pat. No. 2,201,292, issued May 21, 1940, both to Hickey. The latter patents show designs that aspirate a single working cylinder with a pair of tubular, reciprocating valves that are mounted on either side of the piston and driven by secondary crankshafts. The aspirating valves are forcibly reciprocated between port blocking and port aligning positions. The valves are aligned relative to the axis of the cylinder.

Other examples of engines with tubular, reciprocating slide valves that move in a direction generally parallel with the drive piston axis are provided by U.S. Pat. Nos. 1,069,794; 1,142,949; 1,777,792; 1,794,256; 1,855,634; 1,856,348; 1,890,976; 1,905,140; 1,942,648; 2,160,000; and 2,164,522 that are largely cumulative.

U.S. Pat. No. 2,302,442 issued Nov. 17, 1942 shows a tubular, reciprocating sliding valve disposed atop a piston head. The valve slides in an axis generally perpendicular to the axis of the lower drive piston.

U.S. Pat. No. 5,694,890 issued to Yazdi on Dec. 9, 1997 and entitled "Internal Combustion Engine With Sliding Valves" discloses an internal combustion engine aspirated by slidable valves. Tapered, horizontally disposed valve seats are defined near inlet and exhaust ports at the top of the combustion chambers. The slidable valves are tapered to conform to the valve seats. Valve movement is caused by a crankshaft driving a rocker arm that is oriented substantially orthogonal to the rod, whereby crankshaft rotation is translated into horizontal, sliding movements of the planar valves, which reciprocate in a direction normal or transverse to the axis of the piston.

U.S. Pat. No. 7,263,963 issued to Price on Sep. 4, 2007 and entitled "Valve Apparatus For An Internal Combustion Engine," discloses a cylinder head with a cam-driven valve slidably disposed within a valve pocket. The valve, which is displaceable along its longitudinal axis has a tapered portion defining multiple fluid flow passageways. The valve is displaced by cam rotation between a configurations passing gases through the passageways and a configuration wherein the valve flow passageways are closed.

Prior art also includes three previously issued U.S. utility patents owned by the same assignee as in this case, namely Grace Capital Partners, LLC. These patents include U.S. Pat. No. 8,210,147 issued Jul. 3, 2012, and entitled "Sliding valve aspiration system;" U.S. Pat. No. 8,459,227 issued Jun. 11, 2013 and entitled "Sliding valve aspiration;" and, U.S. Pat. No. 8,776,756 issued Jul. 15, 2014 and entitled "Sliding valve aspiration."

SUMMARY OF THE INVENTION

This invention provides an enhanced sliding valve arrangement for internal combustion motor aspiration systems of the general type disclosed in U.S. Pat. Nos. 8,210, 147, 8,459,227, and 8,776,756.

In the present design, the air pathway is substantially straight, and bending and curved or ninety-degree travel routes are minimized or avoided. The valve has a turn down in the middle that allows the air to move through the valve. Each slide valve can be driven by conventional actuators including connecting rods, or each may be driven by opposed magnets on opposite ends of the head valve.

A plurality (i.e., preferably five) sets of spaced-apart ring arrays are provided on the valve body. Each array may comprise at least one piston ring. In the best mode an array may comprise two or more spaced-apart rings that adjoin one another. Separate elongated, annular oiling zones are defined between select groups of ring arrays. For example, annular oiling zones on each slide valve may be defined between the fourth and fifth sets of rings, and between the first and second sets of rings. These oiling zones are pressured by communicating, pressured oiling ports. Oil is confined under pressure within these oiling zones during the full reciprocating travel of the slide valves. By so lubricating the moving slide valve under pressure, friction is reduced. The oil pressure will balance the valve in the bore, so there is virtually no rubbing, chafing or valve scrubbing on the bore wall. When the combustion pressure hits the slide valve, it doesn't move the valve because the constrained oil pressure tends to balance the valve in the center of the cylinder bore.

Thus a basic object of my invention is to provide a highly efficient, sliding valve aspiration system for internal combustion engines, particularly four-cycle designs, including both gasoline and diesel fuel powered engines.

Another basic object is to improve the lubrication of slide valves.

Another fundamental object is to improve the functioning and efficiency of slide valve aspiration systems used with internal combustion engines.

A related object is to provide a valve system of the character described wherein the valve structure does not enter the combustion chambers.

Another object is to provide a sliding valve system that applies force symmetrically, to minimize valve lash and allow higher engine speeds.

Yet another important object is to provide a slide valve with continuously pressured oil zones or pockets to minimize friction and wear. It is a feature of the invention that spaced apart, continuously pressured oil zones are defined in annular spaces along the length of the slide preferred slide valve and continuously pressured during operation.

An important related object is to utilize oil pressure to balance slide valves. A feature of the invention is that the valves are oiled in confined zones, thereby minimizing scrubbing, chafing, or metal-to-metal contact and scraping along the bore or cylinder wall.

A similar related object is to prevent combustion pressure from laterally moving slide valves. It is a feature of the invention that confined oil pressure zones balance the slide valve in the center of the bore.

Another important object is to provide an improved slide valve of the character described that can be displaced with magnetic actuators.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE VARIOUS VIEWS OF THE DRAWINGS

This application incorporates structure and teachings previously described in the following U.S. patents, which are hereby incorporated by reference as if fully set forth herein: U.S. Pat. No. 8,210,147 issued Jul. 3, 2012, and entitled "Sliding valve aspiration system;" U.S. Pat. No. 8,459,227 issued Jun. 11, 2013 and entitled "Sliding valve aspiration;" and, U.S. Pat. No. 8,776,756 issued Jul. 15, 2014 and entitled "Sliding valve aspiration."

Figure 1:
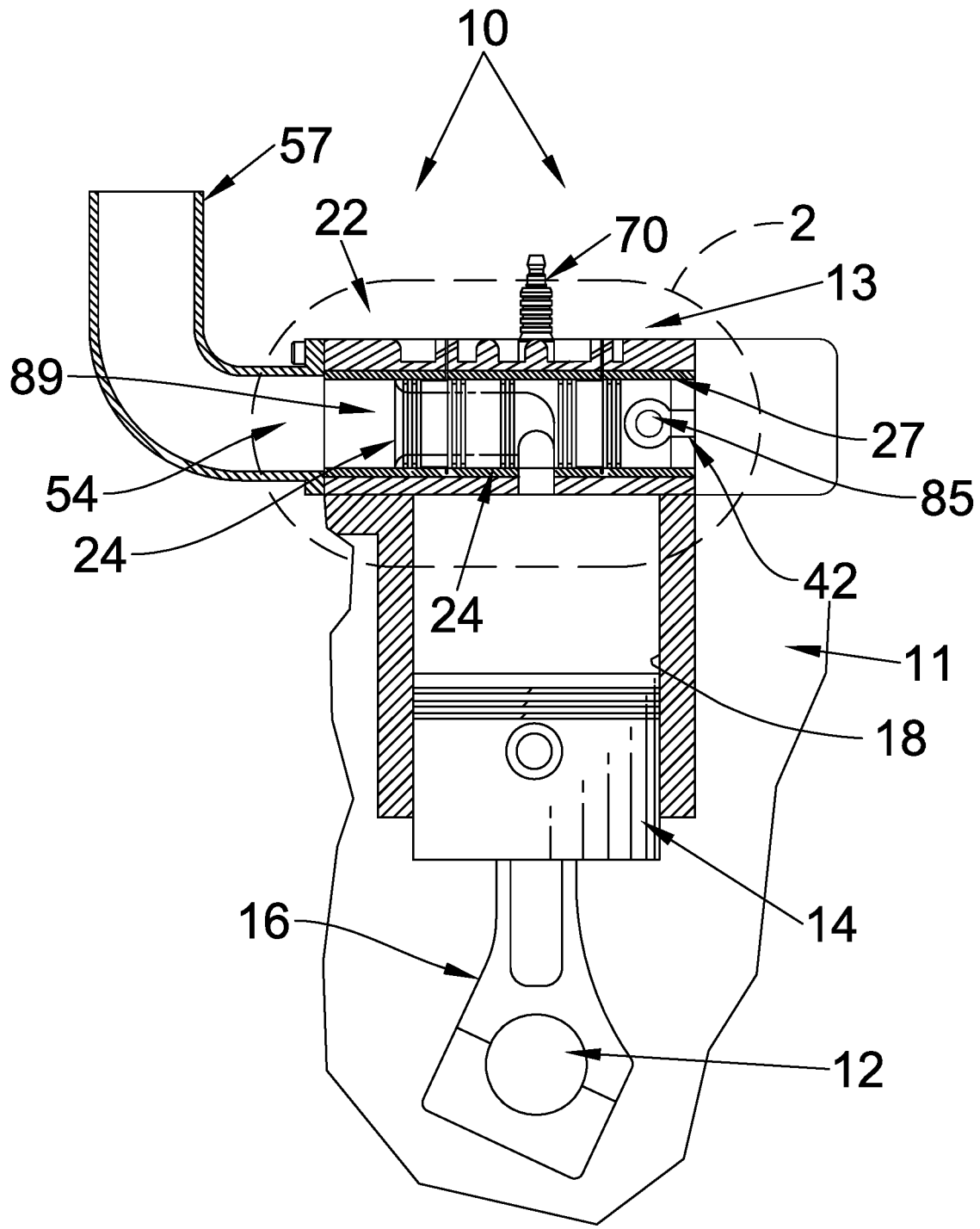
FIG. 1 is a fragmentary, sectional view of an cylinder internal combustion engine equipped with the slide valve system constructed in accordance with the best mode of the invention known at this time.
Figure 2:
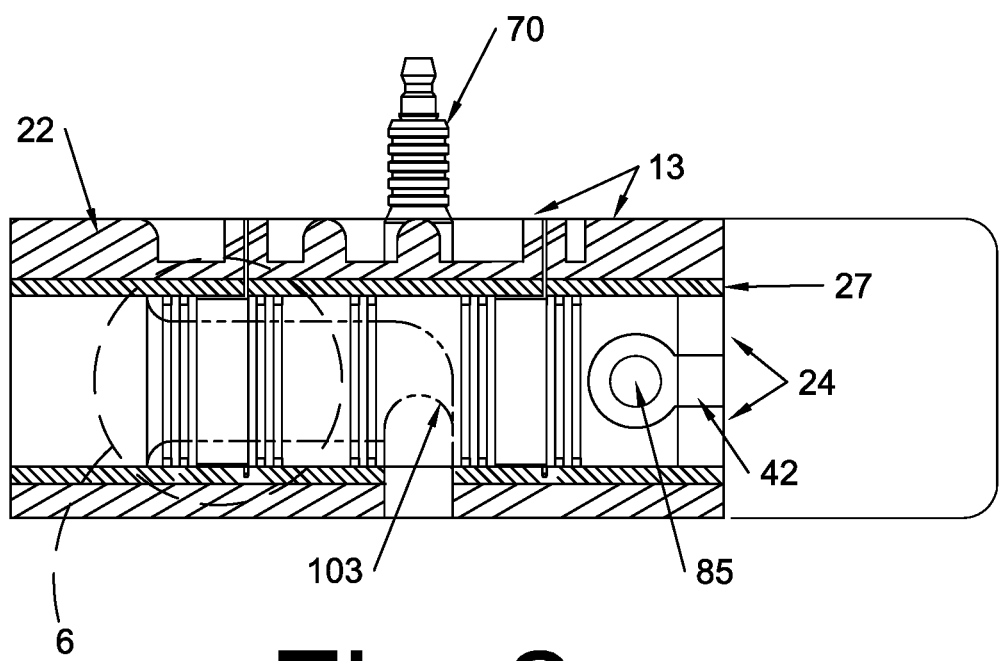
FIG. 2 is an enlarged, fragmentary, sectional view derived from region 2 of FIG. 1.

With initial reference directed now to to FIGS. 1 and 2 of the appended drawings, a single-cylinder, four-cycle internal combustion engine 10 equipped with the instant invention, is illustrated in an abbreviated fashion. The aspiration system constructed in accordance with the best mode of the invention generally designated by the reference numeral 13. It should be understood that the aspiration system as herein described is suitable for use with engines equipped with multiple cylinders, arrayed in the popular V-configuration or other configurations. The system is adapted for use with gasoline, diesel, propane and other hydrocarbon fuels.

Those skilled in the art will recognize that engine has a rigid block 11 (FIG. 1) housing a primary crankshaft 12 of conventional construction that drives a reciprocating power piston 14 with a conventional connecting rod 16. The basic engine illustrated comprises a Honda thirteen-horsepower motor described in detail in the above cited patents, which is modified as hereinafter described. The engine configuration as illustrated can be varied considerably according to recognized standards known to those with skill in the art.

The power piston 14 reciprocates within a cylinder 18 associated with the air-cooled engine 10. The basic construction of piston 14 is substantially conventional and is not critical to practice of the invention. While traveling during the exhaust stroke, spent gases are forced out through an exhaust sleeve valve. During an intake stroke, a fuel-air mixture is sucked inwardly through an intake sleeve valve.

The instant sliding valve system is preferably disposed within a head, generally indicated by the reference numeral 22 (FIG. 1), that mounts conventionally above the piston 14 and cylinder 18 described previously. Piston 14 moves upwardly and downwardly in a direction substantially perpendicular to head 22 by crankshaft 12 and connecting rod 16 in response to firing of spark plug 70. For purposes of this invention, the term "head" shall generally designate that region of an internal combustion engine enclosing the combustion chambers, proximate the pistons. Such a head may be a conventional, separate part bolted atop the engine, or in some cases the "head" may be integral with the engine block in a single casting that is thereafter appropriately machined.

Figure 3:
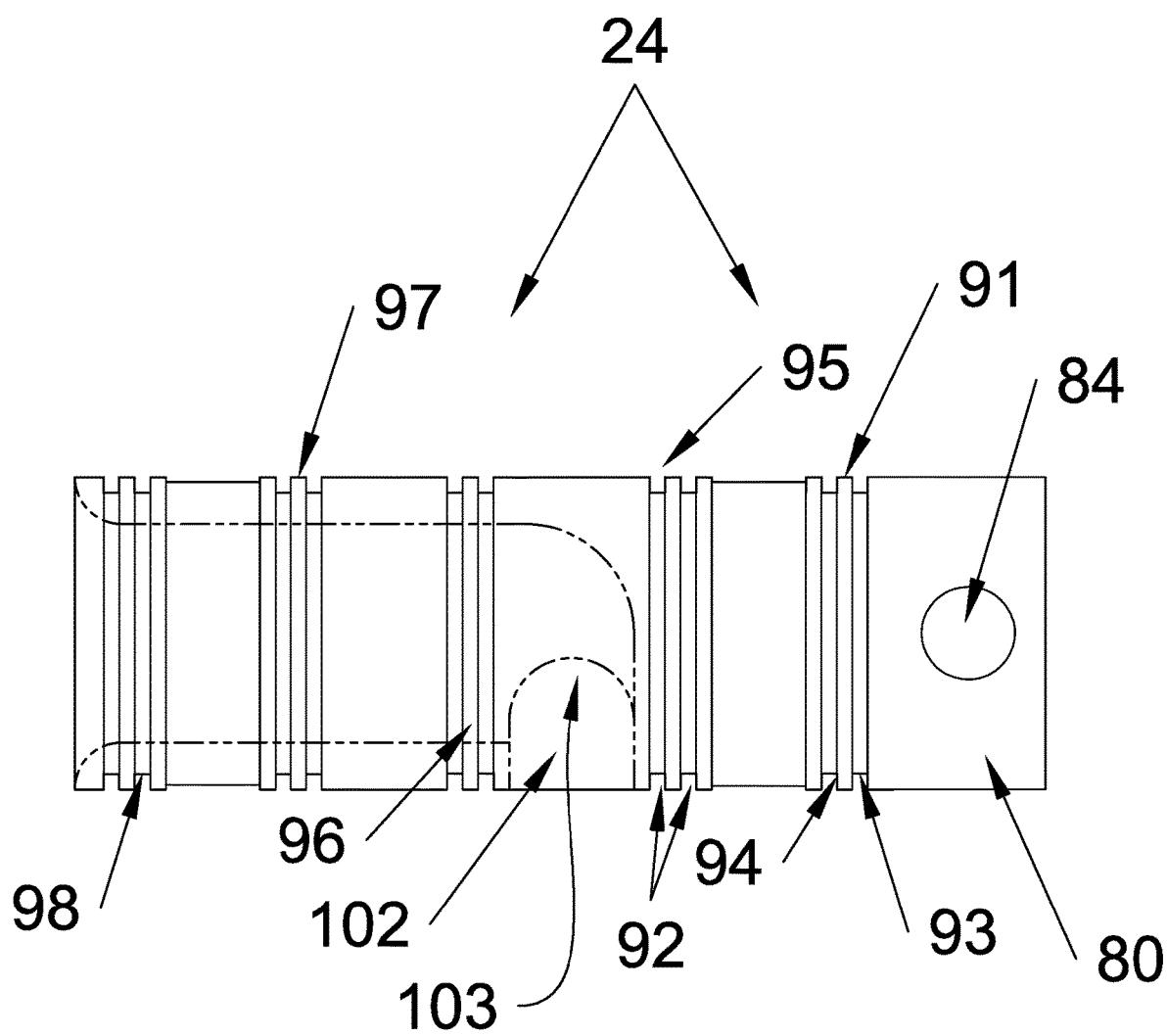
FIG. 3 is an enlarged, fragmentary elevational view of a preferred slide valve, with the rings omitted for clarity.

With reference directed now to FIGS. 1-3, head 22 houses a pair of tubular, slide valves such as slide valve 24 for aspiration. These slide valves reciprocate within a tubular passageway in the form of a slide valve cylinder, that is preferably lined with an alloy sleeve 27, to open and close gas pathways in the manner described in detail in the previously cited Cotton patent references. In operation there will be at least one intake valve, and at least one exhaust slide valve 24 (FIGS. 1, 2), preferably mounted within sleeves. Preferably the slide valves are made from heat resistant alloys such as titanium. It is preferred that the exhaust sleeve be made of Steelite or Nickalloy heat resistant titanium steel alloy. Several alloys of titanium and/or titanium steel are available. Ordinary steel compositions however, result in heat damage and premature wear and failure. It is also preferred that the slide valve 24, and all others, are coaxially mounted in appropriately ported tubular sleeves 27 that fit into the cylinder head 22 and line up and register with the appropriate ports. While sleeveless sliding valve designs are functional, sleeves are much preferred. It is also preferred that the sleeves be coated by treating them with Nickel-boron.

Figure 4A:
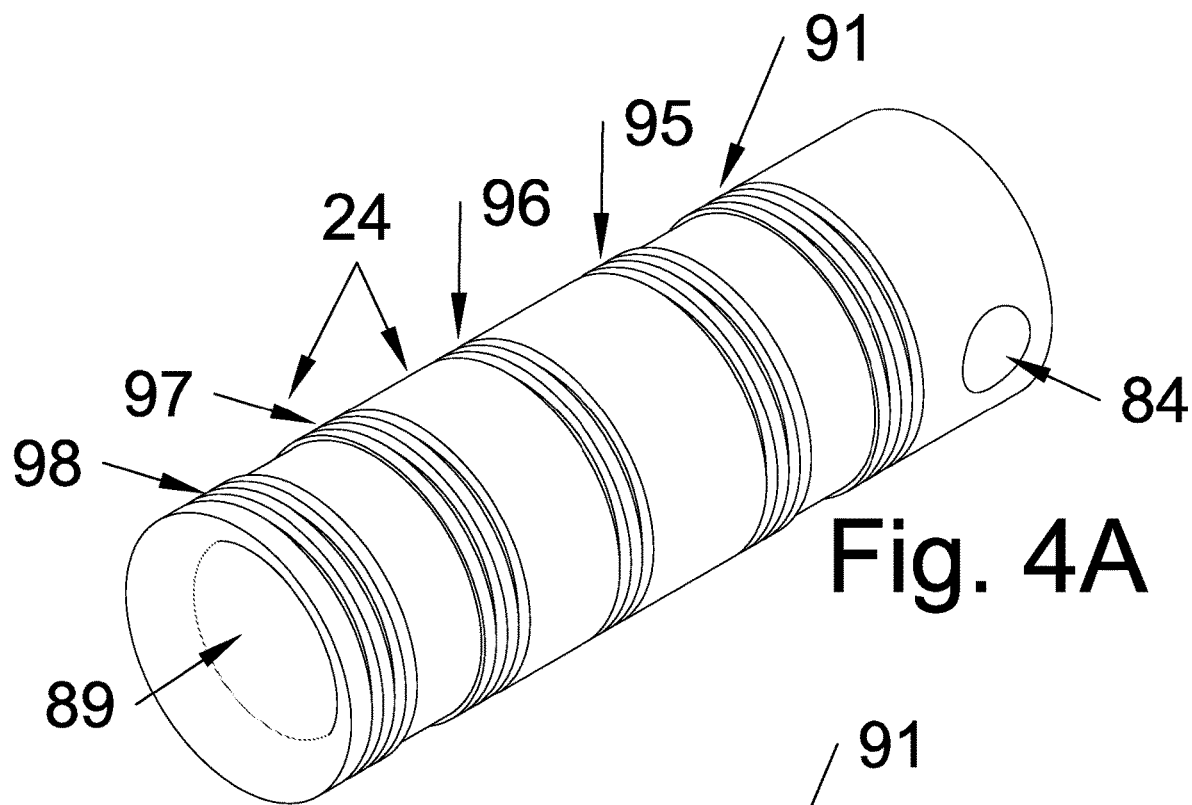
FIG. 4A is an isometric view of the preferred slide valve.
Figure 4B:
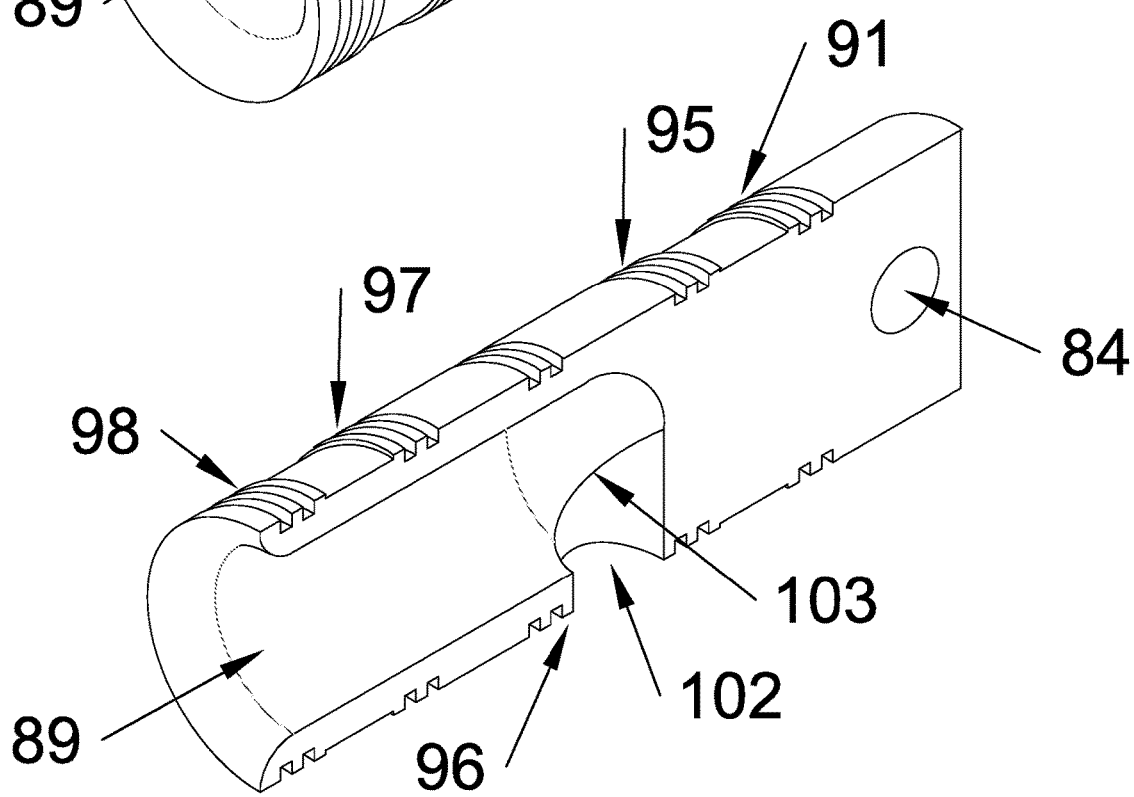
FIG. 4B is a longitudinal sectional view of the preferred slide valve.

Slide valve 24 (i.e., FIG. 4A) slidably reciprocates within sleeve 27 (FIGS. 1, 2) concentrically disposed within tunnel 54 (FIG. 1). Sleeves 27 require oiling ports aligned with head ports described in the referenced Cotton patents. Sleeve 27 is elongated and tubular, and comprises a pair of spaced apart, open ends and an elongated, cylindrical passageway in which the slide valve 24 reciprocates. A manifold 57 exhausts gas during the exhaust stroke which traverses passageway 89 (FIG. 4A). A gently radiused arch 103 (FIGS. 1,3, 4B) at the edge of gas passage cutout 102 (FIGS. 3, 4B) leads to the smoothly configured, generally cylindrical passageway 89 that connects between cutout 102 and the exterior of the valve, passing gases exiting via manifold 57. During a piston exhaust stroke, an exhaust slide valve such as valve 24 will intake waste gases through cutout 102 and output them via open end 89 (FIG. 1) through manifold 57. During an intake stroke, fuel-air mixture will be suctioned through an intake sleeve valve similar to valve 24, entering the valve through a similar open passageway 89 and being drawn into the cylinder through a similar cutout (like cutout 102) defined in an intake sleeve valve. Passageway 89 and the cutout 102 are in fluid flow communication.

Figure 5:
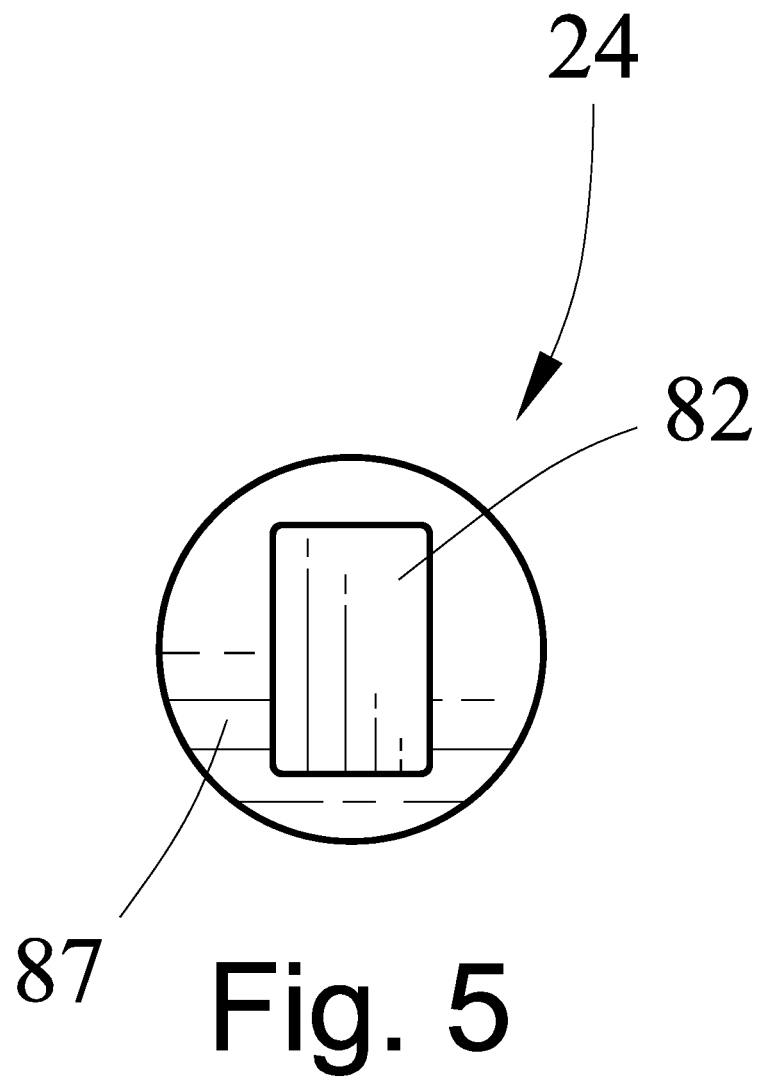
FIG. 5 is an enlarged sectional view taken generally along line 5-5 of FIG. 4.

With emphasis directed to FIGS. 2-3, slide valve 24 is elongated, substantially tubular, and multi-sectioned. An open connection section 80 at the right in FIG. 3 enables mechanical connection of the sleeve valve to a reciprocation actuator, such as a connecting rod 42 (FIGS. 1 and 2) that is journalled by a wrist pin 85 retained within end space 82 (FIG. 5) proximate internal closed wall 87 (FIG. 5) between orifices 84 (FIGS. 3, 4). Alternative actuator means for reciprocating the sleeve valve may be employed, such as cam-driven lifters, crankshafts, magnetic actuators and the like. In the best mode slide valve 24 has a plurality of spaced apart ring arrays. Each array preferably comprises one or more rings seated within suitable ring grooves. In the best mode there are five ring arrays, each of which has an ensemble of ring grooves seating appropriate rings.

The first ring array 91 (i.e., FIG. 3) has a pair of concentric and parallel, spaced-apart ring grooves 93 and 94. The second ring array 95 comprises a similar pair of spaced-apart, concentric ring grooves 92 (FIG. 3). A third ring array 96 is spaced apart across sleeve valve cutout portion 102. The fourth ring array 97 similarly provides for a pair of rings. The fifth ring array 98 near the valve open end (FIG. 3) comprises a similar pair of rings.

Figure 6:
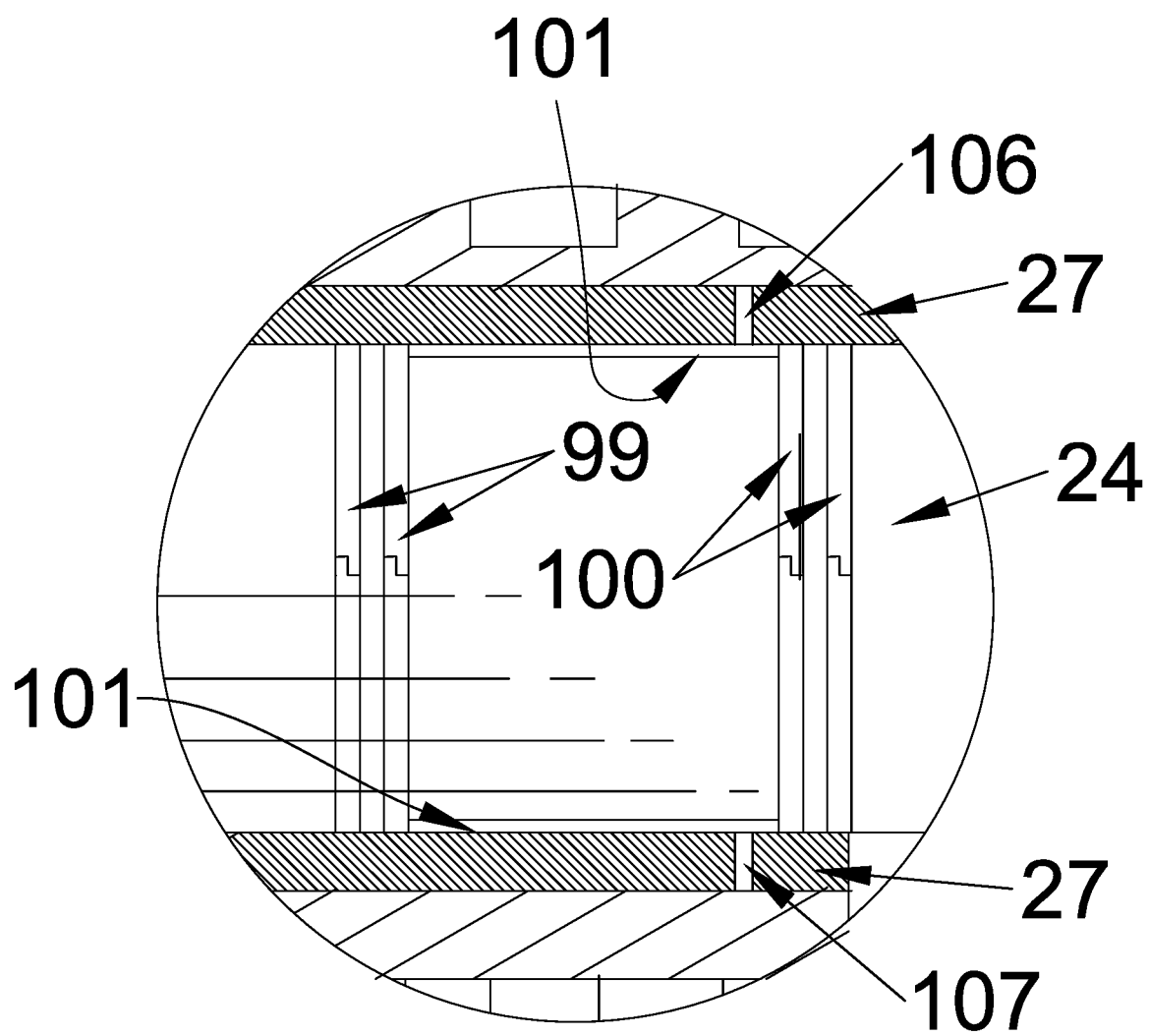
FIG. 6 is an enlarged, fragmentary diagrammatic view derived from circled portion 6 of FIG. 2 showing a preferred slide valve and an annular oil pressure zone, ring arrays, and oiling ports disposed within the oil pressure zone; and, FIG. 7 is a fragmentary sectional view similar to FIG. 6, but showing a moved slide valve indicating the relative position of the oil ports after the slide valve is displaced from the position of FIG. 6, showing the oil ports still disposed within the annular oiling zone.

Referencing FIG. 6, a pair of rings 99 are seated within the ring grooves of ring array 98 (FIG. 3). Another spaced-apart pair of rings 100 (FIG. 6) are seated within the grooves of ring array 97 (FIG. 3). There are of course rings disposed in all ring arrays (not shown) assembled similarly to rings 99, 100. Each ring is preferably made of heat treated and heat resistant nickel alloy steel, and, the compressively touching ends of the rings are stepped in as seen in FIG. 6. Oiling zones are established between various pairs of ring arrays, and these zones are pressurized by oil during valve movements.

An annular oil confinement zone 101 (FIG. 6) formed about the radial periphery of the slide valve 24 and the sleeve 27 is located between and confines by rings 99, 100, or between ring array 96 and ring array 97 (FIG. 6). An oil pressure port inlet port 106 passes through the sleeve 27 into the annular oil confinement zone 101. At the bottom there is an oil pressure return galley 107. Another oil pressure zone similar to zone 101 is defined generally between the ring arrays 91 and 95 (FIG. 3).

Figure 7:
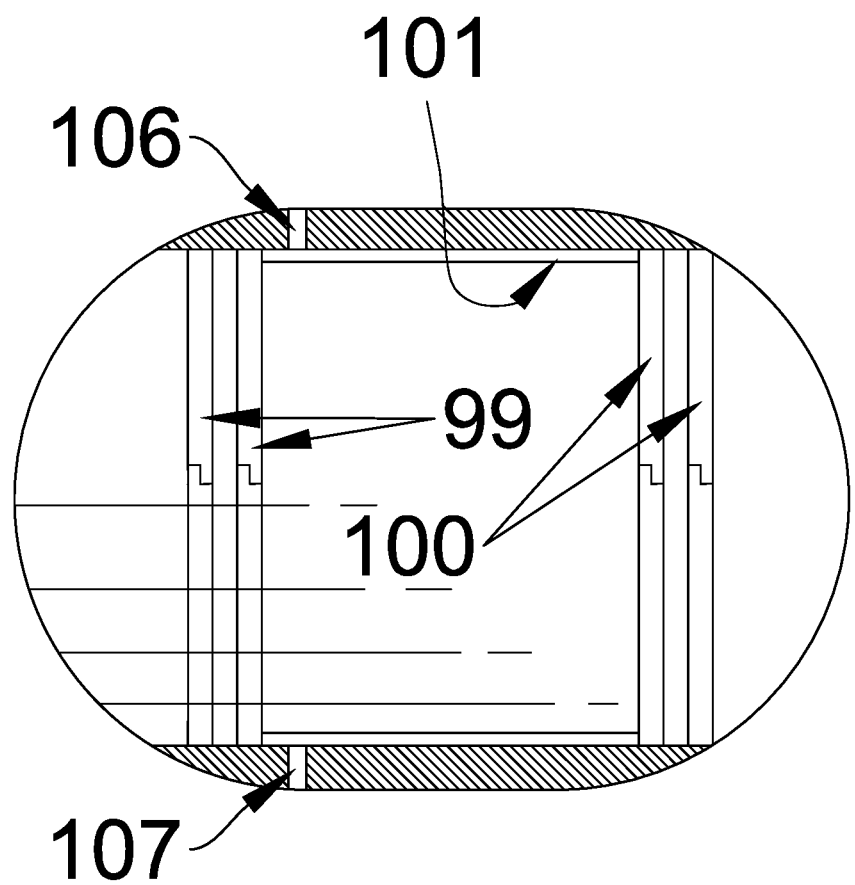

As the slide valve 24 reciprocates back and forth between the positions illustrated respectively in FIGS. 6 and 7, oil input port 106 will always supply oil pressure to oil confinement zone 101. Relief is provided by oil return galley 107 (FIGS. 6, 7). The point is that with said construction, the sleeve valve 24 is continuously pressured by oil traveling between inlet port 106 and return galley 107, with pressure maintained within the annular oil confinement zone 101. Similar oil confinement zones between other ring arrays are similarly pressured during operation.

Each slide valve is adapted to be displaced between an "open" position seen in FIG. 1 and a "closed" positions as described in detail in the previously cited Cotton patents. As viewed in FIG. 7, it is seen that the slide valve 24 has been displaced to the right, having moved from the position of FIG. 6. The inlet oil port 106 and outlet port 107 are still confined to the oil zone 101 between the rings 99, 100. Thus the various oil zones defined between various ring arrays on the slide valve may be semi-permanently pressured.

During operation, this continuous oil pressure helps to stabilize the slide valve, preventing unwanted metal-to-metal contact. Thus valve wear caused by rocking, tipping, chafing or scrubbing is minimized.

From the foregoing, it will be seen that this invention is one well adapted to obtain all the ends and objects herein set forth, together with other advantages inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A slide valve system for aspirating an internal combustion engine with a reciprocating power piston, the slide valve system comprising: an intake slide valve for admitting a combustion mixture into said piston; a separate exhaust slide valve for discharging exhaust from said piston; and, each of said slide valves comprising: an elongated, substantially tubular body adapted to be reciprocated between open and closed positions within a slide valve cylinder; an annulus defined between said body and said slide valve cylinder; the tubular body comprising a connection section blocked to fluid flow for mechanical connection with a reciprocation actuator, a spaced apart open end for conducting gases, and a cutout disposed between said open end and said connection section that is in fluid flow communication with said open end; the tubular body provided with a plurality of ring arrays, each ring array comprising at least one ring; at least one oil confinement zone defined within said annulus between adjacent ring arrays; an inlet oil port continuously communicating with and admitting oil into said oil confinement zone as the slide valve moves between said open and closed positions; and, an oil outlet port continuously communicating with and draining oil from said oil confinement zone as the slide valve moves between said open and closed positions.

2. A pair of slide valves for aspirating an internal combustion engine with at least one reciprocating power piston within a power cylinder, pair of slide valves adapted to assume open and closed positions, the slide valve pair comprising: an intake slide valve for admitting a combustion mixture into said piston; a separate exhaust slide valve for discharging exhaust from said piston; and, each of said slide valves comprising: an elongated, substantially tubular body adapted to be reciprocated within a sleeve proximate a power piston; an annulus defined between said body and said sleeve; the tubular body comprising a connection section blocked to fluid flow for mechanical connection with a reciprocation actuator, a spaced apart open end for conducting gases, and a cutout disposed between said open end and said connection section that is in fluid flow communication with said open end and periodically placed in fluid flow communication with said power cylinder; the tubular body provided with a plurality or ring arrays, each ring array comprising at least one ring; at least one oil confinement zone defined within said annulus between adjacent ring arrays; at least one inlet oil port continuously communicating with and admitting oil into said oil confinement zone as the slide valve moves between open and closed positions and, at least one oil outlet port continuously communicating with and draining oil from said oil confinement zone as the slide valve moves between open and closed positions.

3. A slide valve as defined in claim 1 wherein a radiused arch is internally disposed within said slide valve body proximate said cutout for improving fluid flow.

4. A slide valve as defined in claim 2 wherein a radiused arch is internally disposed within said slide valve body proximate said cutout for improving fluid flow.

* * * * *